United States Patent [19]
Corbasson et al.

[11] Patent Number: 6,147,809
[45] Date of Patent: Nov. 14, 2000

[54] METHOD FOR CORRECTING A LENS OPTICAL ABERRATION

[75] Inventors: Gérard Corbasson, Heand; Jean-Marie Bacchus, St Priest en Jarez; Pierre Nory, Saint Galmier; Christophe Remontet, Saint Etienne, all of France

[73] Assignee: Angenieux S.A., Saint-Heand, France

[21] Appl. No.: 09/147,269

[22] PCT Filed: May 16, 1997

[86] PCT No.: PCT/FR97/00877

§ 371 Date: Nov. 17, 1998

§ 102(e) Date: Nov. 17, 1998

[87] PCT Pub. No.: WO97/44688

PCT Pub. Date: Nov. 27, 1997

[30] Foreign Application Priority Data

May 21, 1996 [FR] France .................................. 96 06276

[51] Int. Cl.$^7$ ........................................................ G02B 1/10

[52] U.S. Cl. ............................. 359/642; 427/166; 359/652

[58] Field of Search ..................................... 359/642, 652; 427/466, 470, 468, 166, 273

[56] References Cited

U.S. PATENT DOCUMENTS 5,299,062  3/1994  Ogata ...................................... 359/718

*Primary Examiner*—Scott J. Sugarman
*Attorney, Agent, or Firm*—Oblon, Spivak, McClelland, Maier & Neustadt, P.C.

[57] ABSTRACT

A process for correcting optical aberration of a lens by depositing a coating on at least one of the face of the lens. The process varies a composition of the coating depending on its thickness, using at least two optical materials having different refractive indices and dispersion indices, the mutual proportions of which are varied during the deposition. Further, the coating is shaped in order to give it the shape of a lens. Such a process may find particular application in the manufacture of objectives.

6 Claims, 3 Drawing Sheets

METHOD FOR CORRECTING A LENS OPTICAL ABERRATION

BACKGROUND OF THE INVENTION

1. Field of the Invention

The present invention relates to optical imaging devices, called objectives, intended for example to equip picture-taking devices, called cameras, and providing images over an extended spectral range ("white light").

2. Discussion of the Background

In the current state of the art, these objectives consist of a succession of centred spherical lenses, composed of various materials which are transparent in the spectral range in question, for example made of glass for the visible wavelengths or made of germanium, silicon or other metalloids for the near-infrared range.

According to methods well known to those skilled in the art, these various lenses, of which these imaging objectives are composed, are matched and made from materials having dispersive properties chosen for correcting as far as possible the aberrations from the so-called longitudinal chromatism, which results from a variation in the focal length of the objective with wavelength. This thus produces what is called aliasing of the spectrum.

Again, methods well known to those skilled in the art are also used to correct aperture aberration, which is on the axis the spherical aberration, in three ways: either by combining a sufficient number of spherical lenses, or by the use of one or more aspheric surfaces, or by the use of gradient index materials. Thus, a correction is made for a central wavelength.

However, a drawback arises in the form of a significant and spurious variation in the spherical aberration with wavelength or, which amounts to the same thing, of the chromatic aberration with the aperture, which phenomenon constitutes spherochromatism.

Thus, for an infrared objective composed of a silicon-germanium doublet, the construction parameters of which are given in Table 1 below:

TABLE 1

| Radius of curvature (mm) | Thickness (mm) | Material |
| --- | --- | --- |
| +91.95 | 5 | Si |
| +287.5 | 2 | |
| +375.1 | 2 | Ge |
| +175.4 | | | the longitudinal spherochromatic aberration curves, shown in FIG. 1, highlight this phenomenon. In these curves, the horizontal axis corresponds to the optical axis of the lens and the vertical axis to an axis perpendicular to the optical axis of the lens. Along this vertical axis is plotted the value of the radius of the pupil which is placed in front of the doublet in the direction of the optical path. For a radius of the pupil equal to 0, the curve gives the value of the residual longitudinal chromatism, i.e. 7 microns in the case of the example chosen. For a certain radius of the pupil, a maximum aberration is obtained, i.e. a residual spherical aberration of 17 microns in FIG. 1. Finally, for a maximum radius of the pupil, i.e. at full aperture, it is observed that the longest, 5 micron wavelength radiation is precisely corrected for spherical aberration, as is the 4 micron wavelength central radiation. However, at this full aperture, the shortest radiation, of 3 micron wavelength, is affected by a 20 micron longitudinal aberration responsible for the perceptible drop in performance of the objective at this full aperture.

Aspherization processes, involving the removal of material (for example, machining or ion bombardment) or involving the addition of material (vacuum deposition of a coating of variable thickness, according to U.S. Pat. No. 7,806,422, filed on Mar. 7 1978 by the Applicant) are known, but they do not apply in the case of chromatism.

Processes for obtaining gradient index materials, having a radial or longitudinal index gradient, are also known, for example ion-diffusion or melting processes.

However, these materials have certain drawbacks. A first drawback with these gradient index materials, in the case of the ion-diffusion process, resides in the fact that the number of materials capable of being diffused in this way is limited, because of physico-chemical compatibility constraints.

A second drawback with these materials, in the case of the process involving successively melting a stack of various glasses, is that there are thermal expansion constraints which preclude a choice of glasses of different chemical groups, which practically removes any useful influence on the correction of chromaticity aberrations.

SUMMARY OF THE INVENTION

The present invention aims to remedy the aforementioned drawbacks.

For this purpose, a subject of the invention is a process for minimizing the spherical aberration and spherochromatism of a lens by depositing a coating on one face of this lens, characterized in that the deposition is carried out by vacuum codeposition of two materials chosen according to their different dispersive chromatic properties, with suitable masking of the lens during the deposition in order to modulate the thickness of the coating in a controlled manner.

The coating produced is endowed with a certain refractive power because of its thickness variation. In addition, it has an effect on the marginal (i.e. full-aperture) spherochromatism because of the variation in the materials of which it is composed, this variation being manifested by a variation in the refractive and dispersive properties on moving from its centre to its periphery. In the text, the terms dispersive properties, dispersion and dispersive gradient refer to the law of variation of the refractive index as a function of wavelength.

According to one particular embodiment of the invention, a process for correcting optical aberration of a lens consists in depositing a dispersive-gradient dioptric coating using two successive operations which are a vacuum evaporation deposition operation followed by a polishing operation.

BRIEF DESCRIPTION OF THE DRAWINGS

Further characteristics and advantages of the present invention will be more clearly apparent in the following description illustrated by the appended figures which represent, respectively.

DESCRIPTION OF THE PREFERRED EMBODIMENTS

Figure 2:
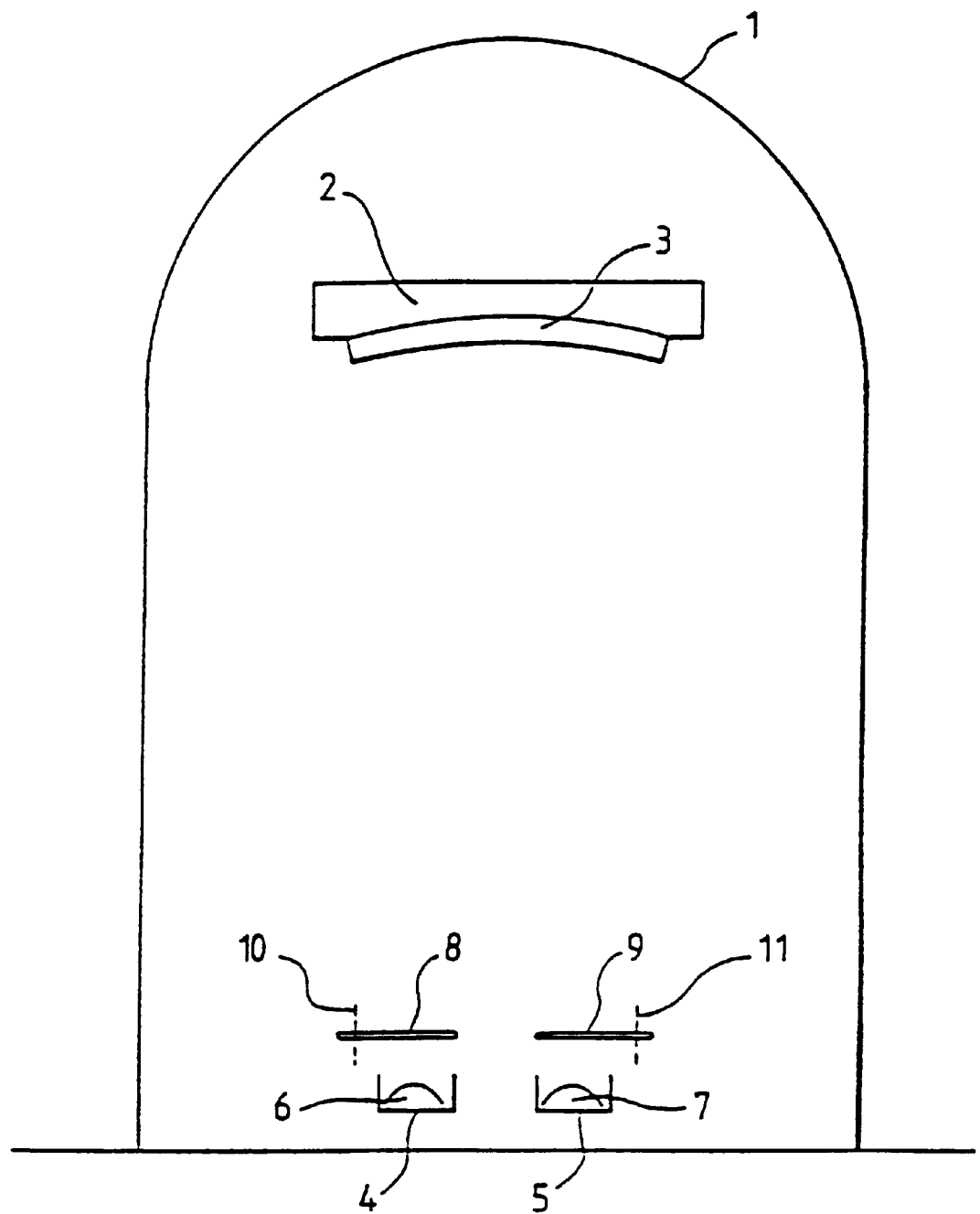
FIG. 2, a device for depositing a dispersive-gradient coating according to the invention.

FIG. 2 shows a device used for depositing a dispersive-gradient coating. A lens 2 to be treated, coated in this drawing with an already deposited coating 3 using a vacuum evaporation process according to one particular embodiment of the invention, is placed in a vacuum chamber 1. Two crucibles 4 and 5 contain materials 6 and 7 having different dispersive chromatic properties, these crucibles being covered by two masks called aperture masks 8 and 9 which pivot about axes 10 and 11.

As a coating is progressively deposited, its composition varies by the controlled movements of the two masks which obscure the evaporation sources to a greater or lesser extent by pivoting about their axes. The movements of the two masks determine the respective fluxes of material diffused towards the lens. These masks can completely unmask the crucibles or, on the other hand, completely obscure them. Thus, the operator is free at any time to deposit on the lens a mixture of which the amount of each material may vary between two extremes, namely a mixture composed of the first material in the pure state to a mixture composed of the second material in the pure state. Between these two extreme compositions, the mixture may be composed of any proportion of the two materials.

Figure 3:
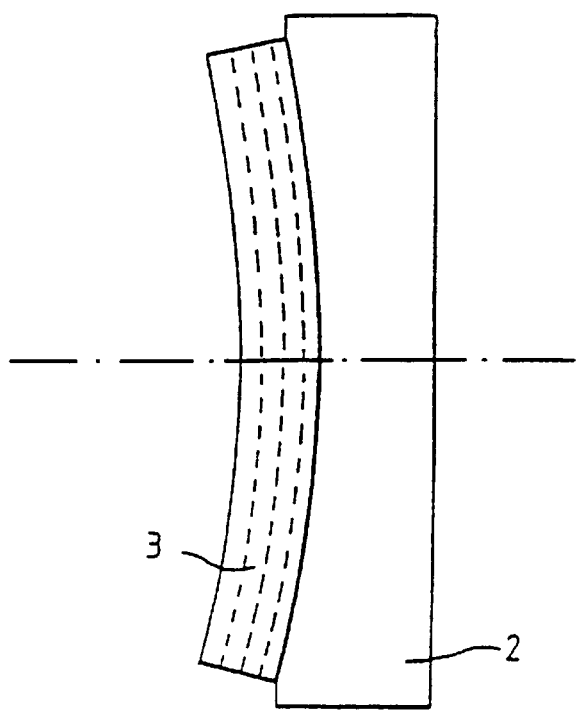
FIG. 3, the deposition of a dispersive-gradient coating on a lens, according to the invention.

After this deposition operation, and as illustrated in FIG. 3 in which the components equivalent to those in FIG. 2 are shown with the same reference numbers, a lens 2 is coated with a dispersive-gradient coating 3 whose optical properties are endowed with a gradient in terms of the direction of the sources, which direction is close to the normal to the surface of the lens. This gradient is called a spherical gradient since the dispersive-gradient coating 3 is composed of concentric spheres.

There is no qualification relating to the thickness of the coating since the present invention is not limited to coatings called thin coatings, so termed in general when their thicknesses are of the order of the wavelength and when they have only an interference function. According to the present invention, the dispersive-gradient coating may have any thickness. At this stage in the process, the dispersive-gradient coating is equivalent to a plate having parallel faces or concentric faces.

Figure 4:
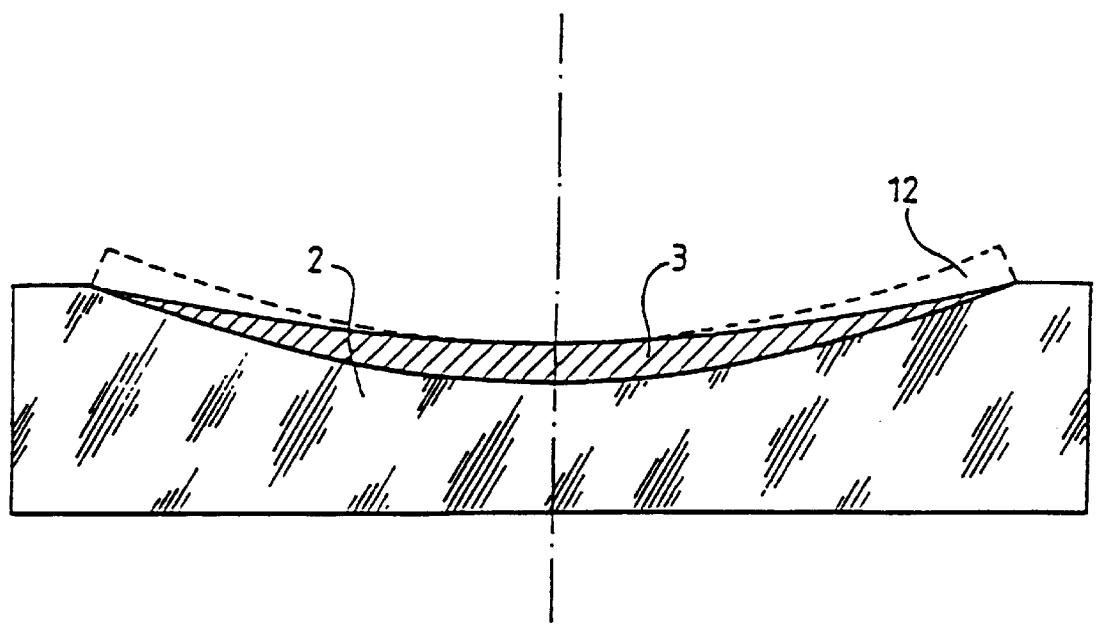
FIG. 4, an operation which makes it possible to obtain the dioptric power of the coating, according to the invention.

FIG. 4, in which the components equivalent to those in FIG. 2 and FIG. 3 are shown with the same reference numbers, shows the second part of the process. This shows an operation which makes it possible to obtain the dioptric power of the dispersive-gradient coating by polishing and by the removal of material 12. That part of the dispersive-gradient coating remaining on the lens 2 then has the shape of a meniscus 3 in the case of a lens having a concave face. The coating is then referred to as a dioptric dispersive-gradient coating.

In another embodiment according to the invention, a dioptric dispersive-gradient coating is obtained by additional masking in the region of the lens during the deposition (field masking) according to the process described in particular in the aforementioned patent, allowing a coating to be obtained whose thickness varies in real time.

Figure 5:
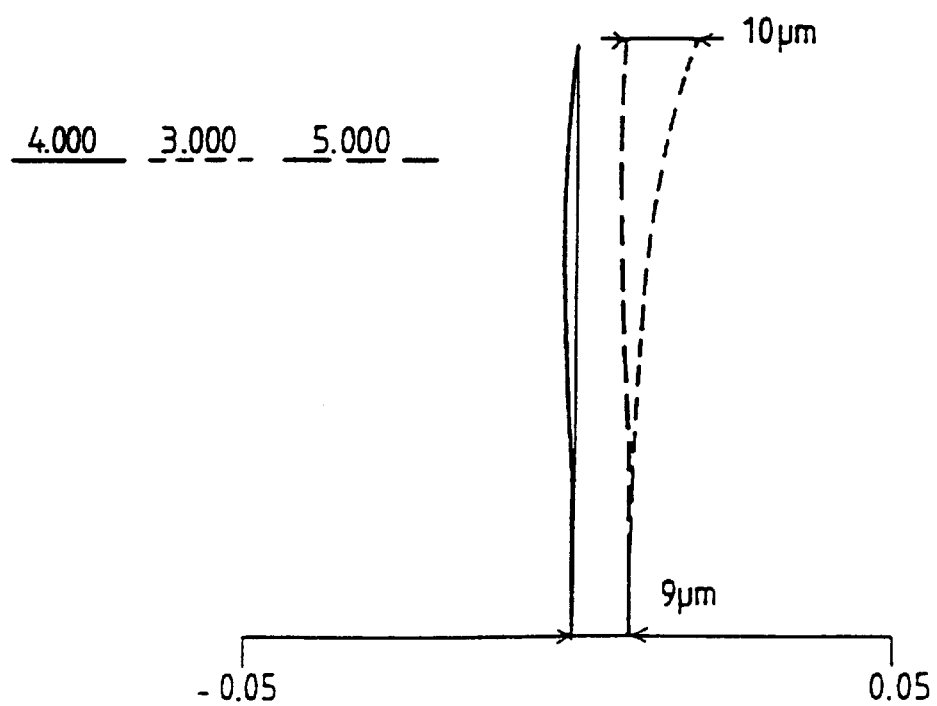
FIG. 5, longitudinal spherical aberration curves for a silicon-germanium doublet obtained according to the invention.

In order better to understand the key advantage provided by a dioptric gradient index coating thus obtained, FIG. 5 shows longitudinal spherical aberration curves for a silicon-germanium doublet to which a dioptric gradient index coating has been applied according to the invention. The composition of the dioptric gradient index coating varies linearly, over a thickness of 55 microns, from zinc sulphide to zinc selenide, as indicated in the following table which gives the parameters for constructing the lens in its final composition:

TABLE 2

| Radius of curvature (mm) | Thickness (mm) | Material |
|---|---|---|
| ∞ | 0.055 | ZnS→ZnSe |
| −5682 | 0 | |
| +89.11 | 5 | Si |
| +255.9 | 2 | |
| +292.9 | 2 | Ge |
| +153.6 | | |

Figure 1:
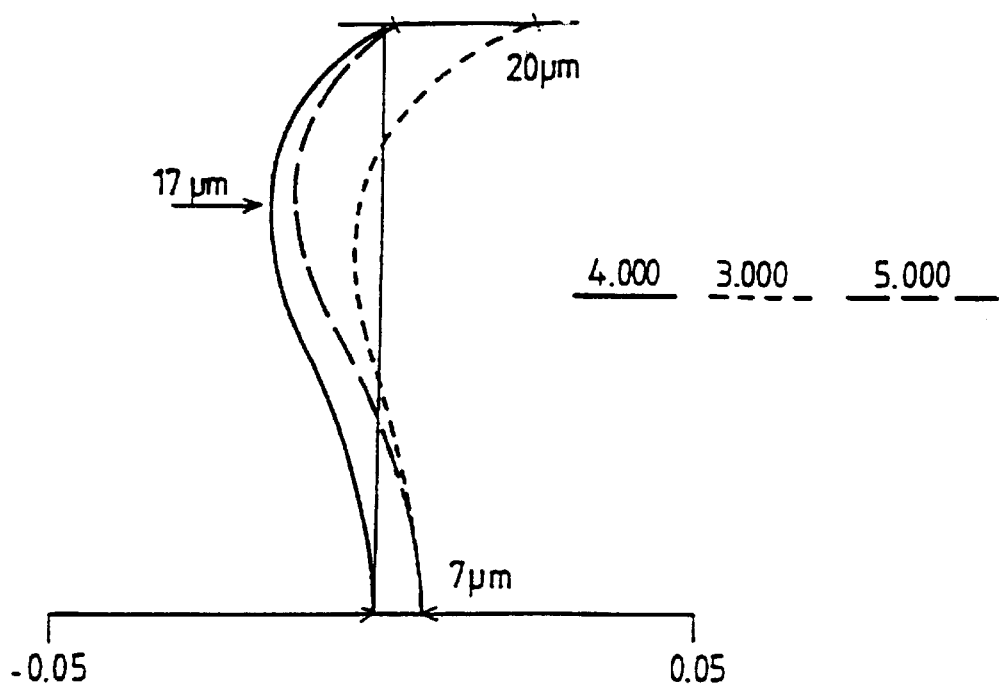
FIG. 1, longitudinal spherical aberration curves for a silicon-germanium doublet obtained according to the prior art.

The curves in this FIG. 5 should be compared with the curves shown in FIG. 1, which characterize the silicon-germanium doublet described in the prior art. The residual spherical aberration has been considerably reduced and the spherochromatism at full aperture between the two extremes of radiation—3 microns and 5 microns—has been reduced to 10 microns instead of 20 microns.

From an industrial standpoint, this dioptric gradient index coating results virtually in the elimination of the residual spherical aberration and the halving of the spherochromatism.

What is claimed is:

1. A process for forming a coating on a lens for reducing spherical aberration and spherochromatism of the lens, comprising the steps of:

depositing a coating on one face of the lens by vacuum codeposition of both first and second materials on the one face of the lens, wherein the first and second materials are chosen according to their different dispersive chromatic properties; and masking, during the depositing step, the lens in order to modulate a thickness of the coating in a controlled manner.

2. A process according to claim 1, wherein the vacuum deposition is carried out by at least one of evaporation, bombardment, or sputtering.

3. A process for forming a coating on a lens reducing spherical aberration and spherochromatism of the lens, comprising the steps of:

depositing a coating on one face of the lens by vacuum codeposition of both first and second materials on the one face of the lens, wherein the first and second materials are chosen according to their different dispersive chromatic properties; and removing part of the coating after the depositing step by polishing.

4. A process according to claim 3, wherein the vacuum deposition is carried out by at least one of evaporation, bombardment, or sputtering.

5. A process for forming a coating on a lens for reducing spherical aberration and spherochromatism of the lens, comprising the steps of:

depositing a coating on one face of the lens by simultaneous deposition of both first and second materials on the one face of the lens by a vacuum evaporation operation, wherein the first and second materials are chosen according to their different dispersive chromatic properties;

adjusting, during the depositing step, a relative proportion of deposited substance coming from the first and second materials by controlling movement of a first mask masking the first material and a second mask masking the second material; and controlling, during the depositing step, movement of a third mask, which rotates and which masks the lens, to modulate a thickness of the deposited coating.

6. A process for forming a coating on a lens for reducing spherical aberration and spherochromatism of the lens, comprising the steps of:

depositing a coating on one face of the lens by simultaneous deposition of both first and second materials on the one face of the lens by a vacuum evaporation operation, wherein the first and second materials are chosen according to their different dispersive chromatic properties; and adjusting, during the depositing step, a relative proportion of deposited substance coming from the first and second materials controlling movement of a first mask masking the first material and a second mask masking the second material.

* * * * *